US009009225B2

(12) United States Patent
Kjesbu et al.

(10) Patent No.: US 9,009,225 B2
(45) Date of Patent: Apr. 14, 2015

(54) SYSTEM AND METHOD FOR CONFERENCE MANAGEMENT

(75) Inventors: Snorre Kjesbu, Billingstad (NO); Kjell Yngvard Garatun-Tjeldstø, Bergen (NO); Lars Hiim, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 1936 days.

(21) Appl. No.: 12/051,377

(22) Filed: Mar. 19, 2008

(65) Prior Publication Data

US 2008/0235362 A1 Sep. 25, 2008

Related U.S. Application Data

(60) Provisional application No. 60/895,636, filed on Mar. 19, 2007.

(30) Foreign Application Priority Data

Mar. 19, 2007 (NO) .................................. 20071451

(51) Int. Cl.
*G06F 15/16* (2006.01)
*H04N 7/15* (2006.01)
*H04L 29/06* (2006.01)
*H04M 3/56* (2006.01)

(52) U.S. Cl.
CPC .............. *H04N 7/15* (2013.01); *H04L 65/4038* (2013.01); *H04M 3/567* (2013.01)

(58) Field of Classification Search
USPC ........................................................ 709/204
See application file for complete search history.

(56) References Cited

U.S. PATENT DOCUMENTS

| 6,396,510 | B1 | 5/2002 | Pendse et al. |
|---|---|---|---|
| 2002/0093531 | A1 | 7/2002 | Barile |
| 2003/0144004 | A1 | 7/2003 | Canova, Jr. et al. |
| 2004/0047461 | A1* | 3/2004 | Weisman et al. ........ 379/202.01 |
| 2004/0119814 | A1 | 6/2004 | Clisham et al. |
| 2004/0239754 | A1 | 12/2004 | Shachar et al. |
| 2005/0084086 | A1* | 4/2005 | Hesse ....................... 379/202.01 |
| 2005/0144233 | A1* | 6/2005 | Kjesbu et al. .................. 709/204 |
| 2005/0276406 | A1 | 12/2005 | Keohane et al. |
| 2006/0203083 | A1 | 9/2006 | Wilson, Jr. et al. |
| 2006/0244818 | A1* | 11/2006 | Majors et al. .............. 348/14.08 |

(Continued)

FOREIGN PATENT DOCUMENTS

| EP | 1 571 808 A1 | 9/2005 |
|---|---|---|
| EP | 1 744 527 A1 | 1/2007 |

(Continued)

*Primary Examiner* — Richard G Keehn
(74) *Attorney, Agent, or Firm* — Lempia Summerfield Katz LLC

(57) ABSTRACT

A method in a mobile communication device for communication over a wireless network for managing conference equipment, including: establishing a connection with a video conferencing management server via the wireless network; receiving information from the video conferencing management server, the information including one or more lists of entries from one or more phone books or personal information of a user of the mobile device; generating a user interface to allow the user to select one or more of the entries from the one or more phone books or personal information; and creating a control message, based on at least a selected one or more of the entries from the one or more phone books or personal information, that instructs the video conferencing management server to initiate or schedule a videoconference.

32 Claims, 6 Drawing Sheets

TABLE 1: MESSAGES FROM CLIENT TO SERVER

| Request code | Parameters | Explanation |
|---|---|---|
| 01 | | Request connect |
| 02 | tlph, password | Request login |
| 03 | phonebookID, tlph | Request contactslist of selected phonebook |
| 04 | numCalls, numID, tlph1, type1, tlph2, type2,..., id1, id2... | Request conference |
| 05 | tlph | Request phonebooks |

(56) References Cited

U.S. PATENT DOCUMENTS

| | | |
|---|---|---|
| 2007/0050448 A1 | 3/2007 | Gonen et al. |
| 2007/0093238 A1 | 4/2007 | Lin |
| 2007/0285504 A1* | 12/2007 | Hesse .................. 348/14.08 |
| 2007/0291917 A1* | 12/2007 | Berstis et al. ............ 379/202.01 |
| 2008/0088698 A1* | 4/2008 | Patel et al. ............... 348/14.09 |
| 2008/0109517 A1* | 5/2008 | Sarkar et al. .................. 709/206 |
| 2008/0165945 A1* | 7/2008 | Vadlakonda et al. .... 379/204.01 |
| 2009/0097627 A9* | 4/2009 | Liljestrand et al. ...... 379/201.03 |

FOREIGN PATENT DOCUMENTS

| | | |
|---|---|---|
| GB | 2 319 433 A | 5/1998 |
| KR | 20020020136 | 3/2002 |
| WO | WO 03/092287 A1 | 11/2003 |
| WO | WO 2006/023961 A2 | 3/2006 |
| WO | WO 2006/075043 A1 | 7/2006 |

\* cited by examiner

TABLE 1: MESSAGES FROM CLIENT TO SERVER

| Request code | Parameters | Explanation |
|---|---|---|
| 01 | | Request connect |
| 02 | tlph, password | Request login |
| 03 | phonebookID, tlph | Request contactslist of selected phonebook |
| 04 | numCalls, numID, tlph1, type1, tlph2, type2,..., id1, id2... | Request conference |
| 05 | tlph | Request phonebooks |

Figure 1A:
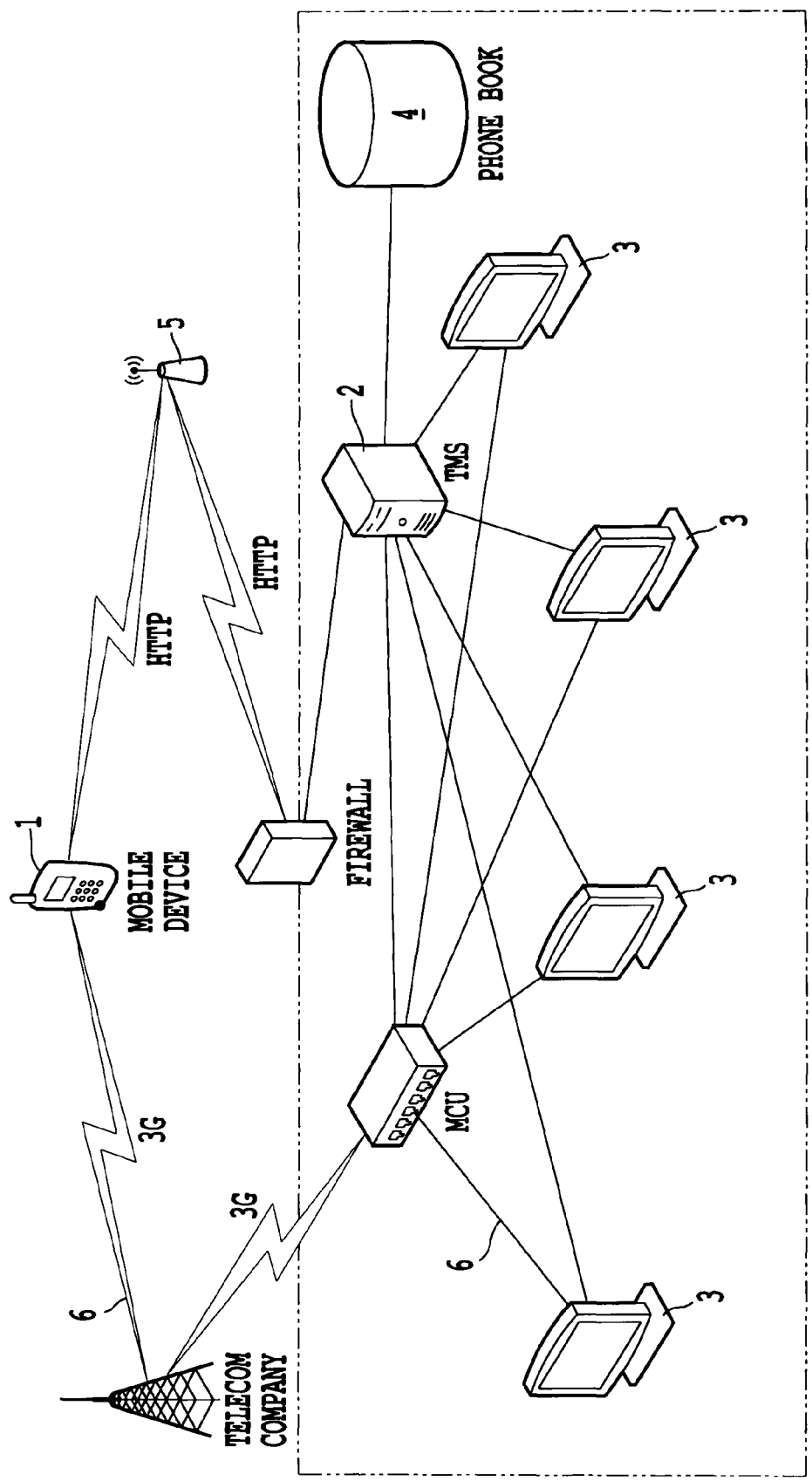

*Fig. 1B*

TABLE 2: MESSAGES FROM SERVER TO CLIENT

| Response code | Parameters | Explanation |
|---|---|---|
| 000 | | Connection failed |
| 001 | | Not handled by server |
| 002 | | Login refused |
| 003 | | Get contactlist refused |
| 004 | | Setup conference refused |
| 005 | | Get phonebooks refused |
| 101 | | Connection OK |
| 102 | | Login OK |
| 103 | num, name1, id1, name2, id2,... | Get contactlist OK |
| 104 | | Setup conference OK |
| 105 | num, name1, id1, name2, id2,... | Get phonebooks OK |

*Fig. 1C*

SYSTEM AND METHOD FOR CONFERENCE MANAGEMENT

CROSS-REFERENCE TO RELATED APPLICATIONS

The present application claims the benefit of priority under 35 U.S.C. §119(e) to provisional application Ser. No. 60/895,636, filed Mar. 19, 2007, and under 35 U.S.C. §119(a) to Norwegian application 20071451, filed Mar. 19, 2007, both of which are hereby incorporated by reference.

FIELD OF THE INVENTION

The present invention relates to managing video conference equipment and scheduling of video conferences from mobile communication devices.

BACKGROUND OF THE INVENTION

Conventional videoconferencing systems comprise a number of end-points communicating real-time video, audio and/or data streams over and between various networks such as WAN, LAN and circuit switched networks.

In addition to traditional stationary video conferencing endpoints, mobile communication devices, such as mobile phones and PDA's, have recently entered the visual communication marketplace. The increasing functionality and the constant advancements in transmission bandwidth for such devices, and their superior mobility, make them perfect devices for visual communication when travelling. Further, gateways provide interfacing between traditional video conferencing networks, e.g. WAN, LAN and circuit switched networks, and cellular telephone networks, e.g. 3G, rendering videoconferences between mobile communication devices and stationary end-points possible.

A number of videoconference systems residing at different sites may participate in the same conference, most often, through one or more MCU's (Multipoint Control Unit) performing, i.e., switching functions to allow the audiovisual terminals to intercommunicate properly.

As videoconferencing involves various resources and equipment simultaneously interoperating at different localizations and capabilities, there is a need for the possibility to manage the resources involved both for scheduled and ad hoc videoconferences.

Videoconferencing systems are therefore often provided with a management system. A management system is a module that is used to schedule or book resources at any given point in time. The management system will allow a user to request resource usage at a given time, and either allow or disallow the usage at that time. Management systems are often used for scheduling the use of meeting rooms, network resources, video systems etc. The management system must be connected to a database containing updated information regarding all accessible resources like MCU's, gateways, routers, end-points etc. The management system normally operates with an intuitive web interface requiring no additional installation on the user terminal other than a conventional web browser.

As mentioned above, the increased functionality and available bandwidth of mobile communication devices has made them popular tools in business communication. Being able to conduct visual communication almost anywhere and anytime increases productivity and decision making. However, the lack of a global number plan for IP based telecommunication equipment and the fact that most IP based equipment is behind a firewall, makes it hard to access stationary endpoints or similar equipment from a mobile communication device. Further, if 3 or more participants (multipoint call) are designated for a conference call, the call must be set up via an MCU. Even though multipoint calls may be scheduled ad hoc in a video conferencing management system, the user may not have a computer nearby or the internet connection necessary to interface with such a system.

Further, in a typical office environment tens or even hundreds of employees may share access to a plurality of different video conferencing systems in meeting rooms or the like. When utilizing different types of systems, operation and settings are easily forgotten. Since many employees share one or more endpoints, personal information such as last numbers called/received, speed dial listings, etc. are easily erased from such a shared endpoint.

Therefore, a user friendly, mobile and personalized system and method for ad-hoc scheduling of video conferences, and performing other management tasks, is needed.

"Vyke Mobile", referred to in the presentation "Vyke Low Cost Converged Communication", September 2006, in particular p. 24, published at http://www.vykecorporate.com/Tower-Vyke-September%202006v2.pdf, provides a java-client for mobile phones that allows setup of a point to point call between two regular mobile phones on the GSM network (Global System for Mobile Communication). Vyke Mobile works by sending your call information (where you are calling to and where you are calling from) to the Vyke platform via GPRS/Internet. Once the Vyke platform receives your information, it performs the action you have requested. Vyke Mobile allows you to define both the phone number you want to call to and the phone number you want to call from. As all communication between Vyke Mobile and the Vyke platform is via the Internet, the service will not function if the phone is not correctly configured. The phone must be capable of connecting to WAP/Internet. The Vyke Mobile solution is an audio only solution and only supports point-to-point calls.

SUMMARY OF THE INVENTION

It is an object of the present invention to provide methods, computer programs and a system for managing conference equipment from a client application on a mobile communication device.

The features defined in the independent claims enclosed characterise the methods, the computer programs and the system.

BRIEF DESCRIPTION OF THE DRAWINGS AND TABLES

Figure 2:
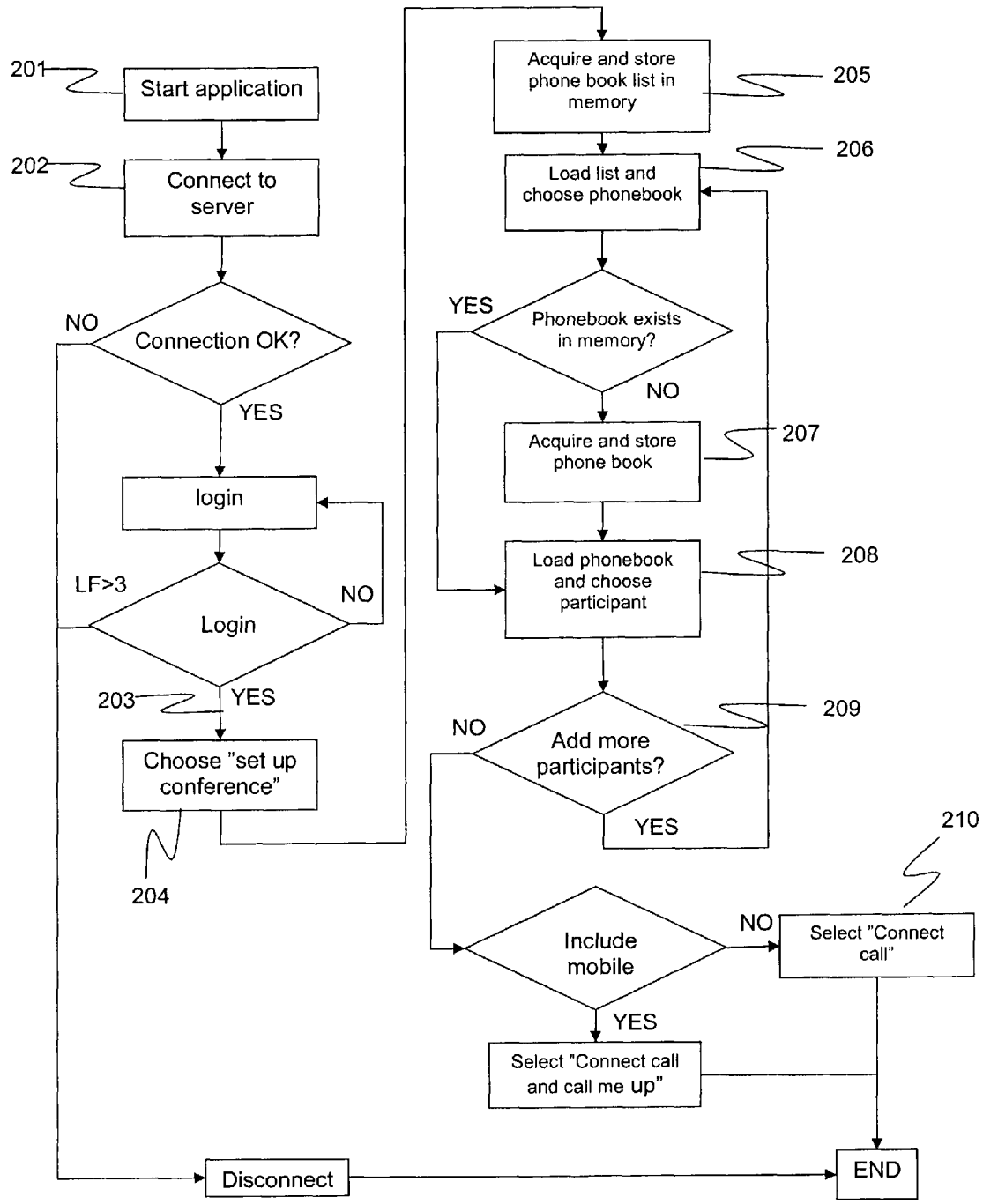
Figure 3:
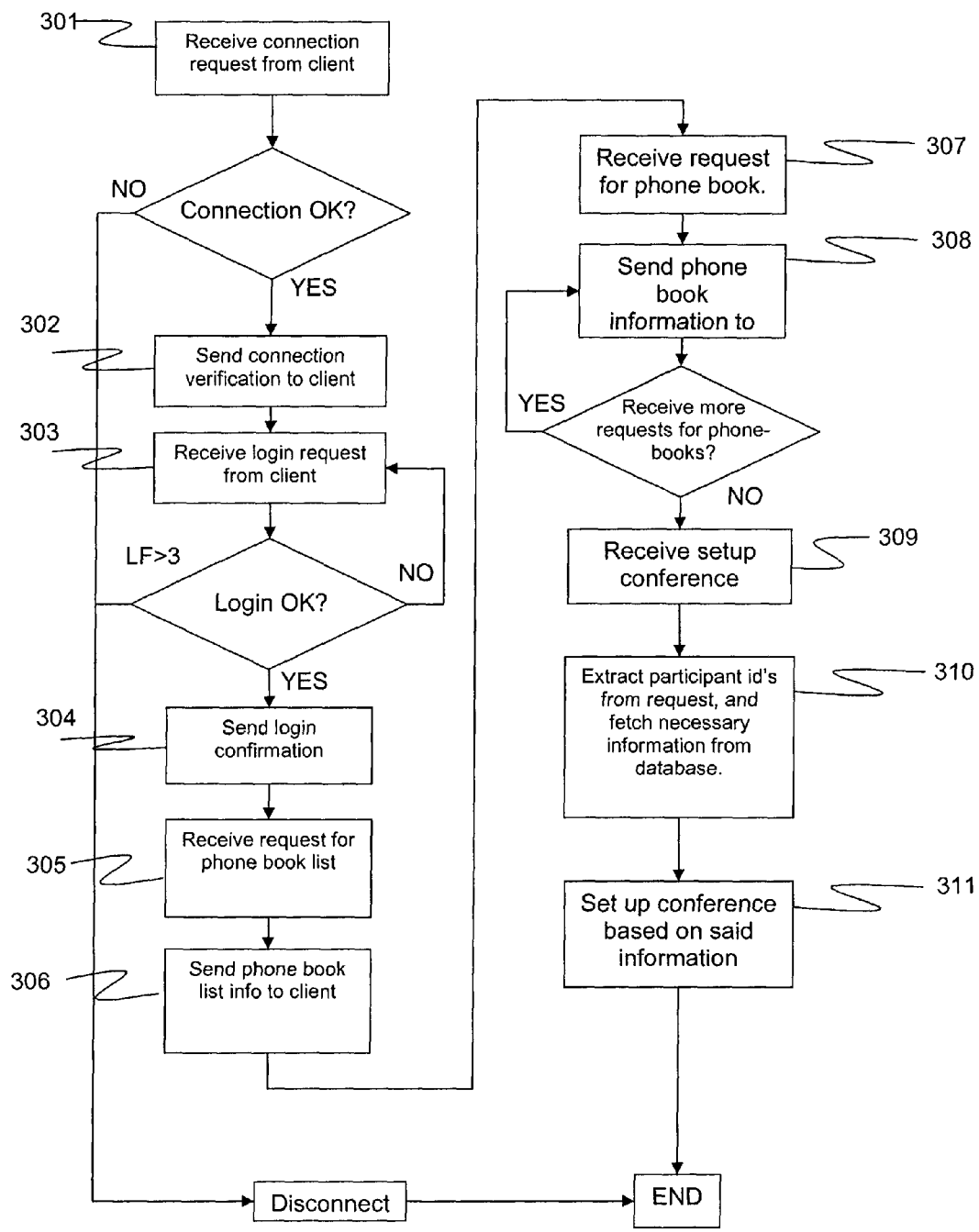
Figure 4:
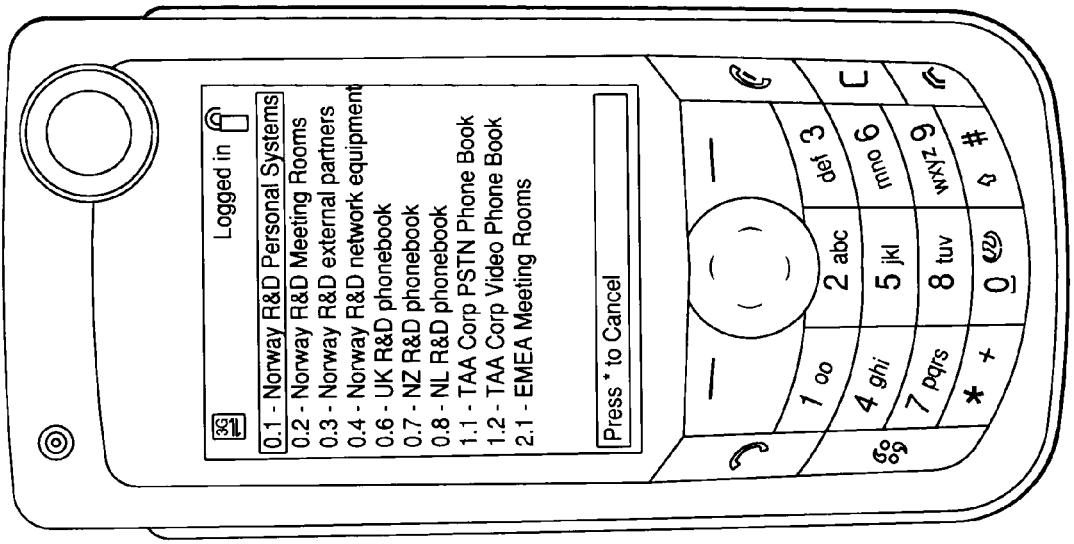
Figure 5:
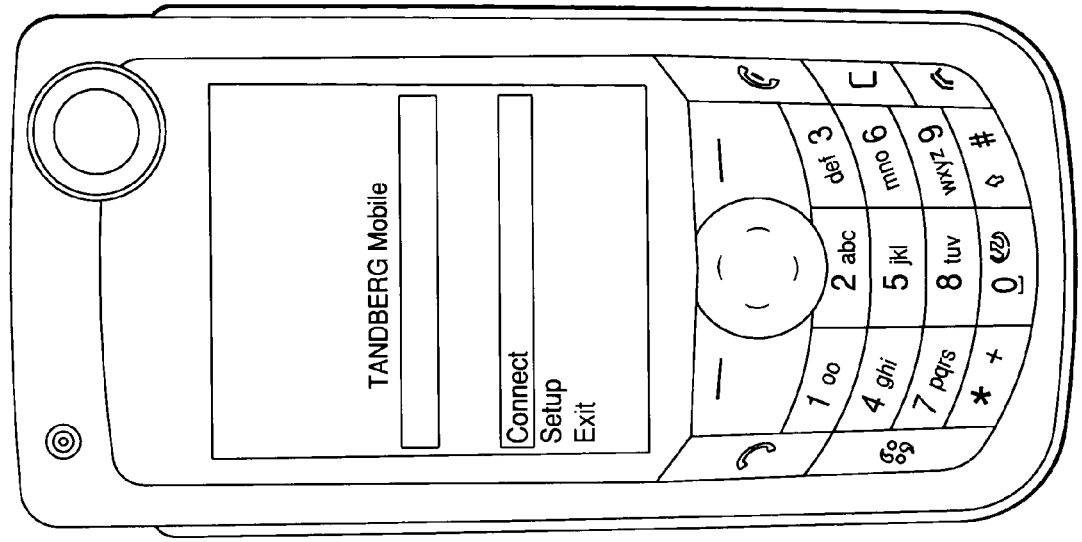
Figure 7:
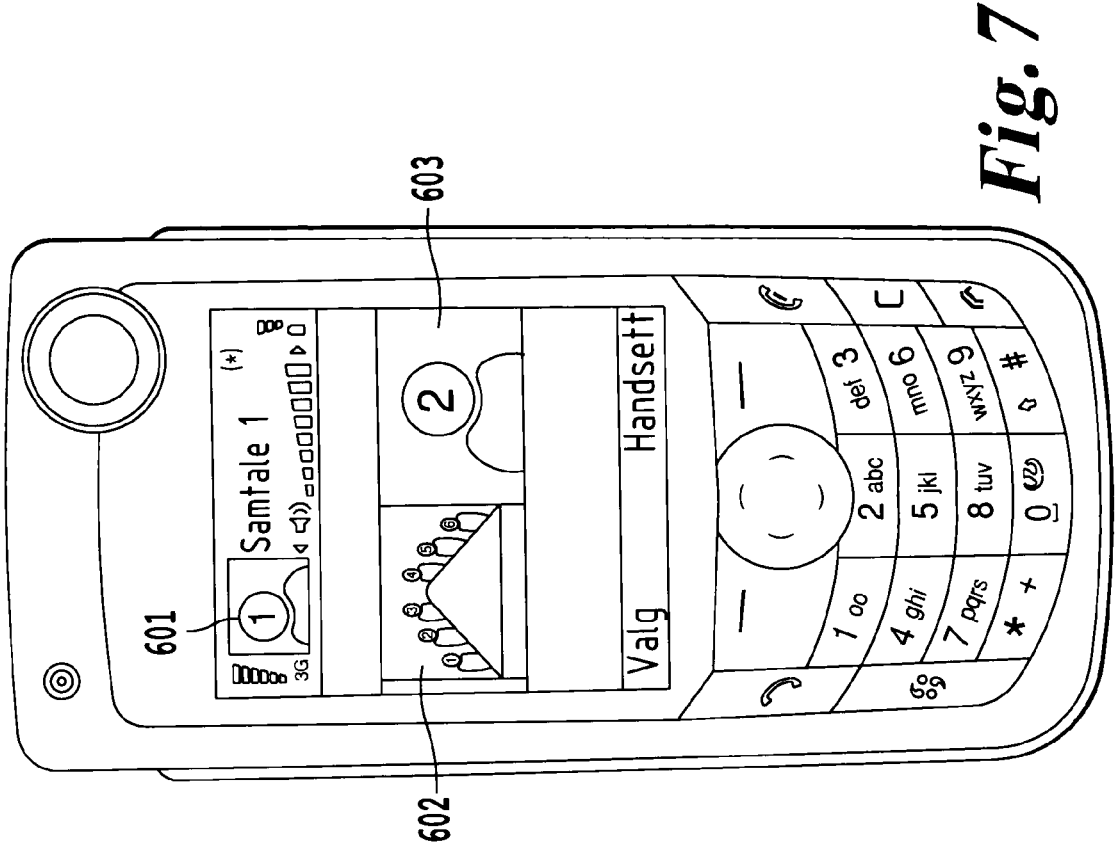
Figure 6:
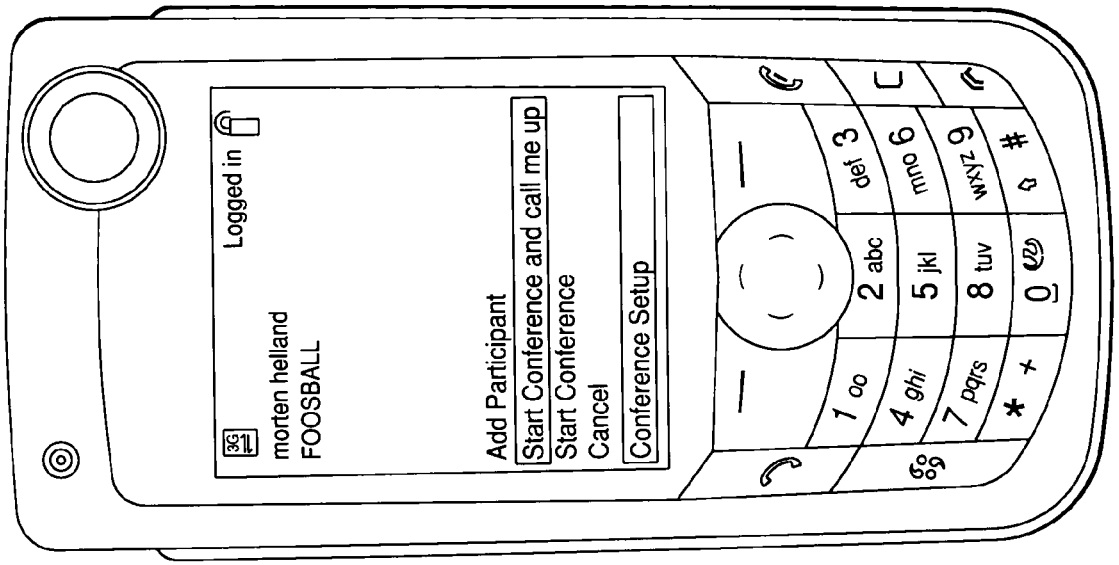

In order to make the invention more readily understandable, the discussion that follows will refer to the accompanying drawings, wherein FIG. 1 is a block diagram showing a typical configuration of a system according to a non-limiting embodiment of the present invention, FIG. 2 is a flow diagram showing an exemplary client and server communication session from the client side, FIG. 3 is a flow diagram showing an exemplary client and server communication session from the server side, FIG. 4 illustrates a mobile communication device running the client application startup screen, FIG. 5 illustrates a mobile communication device running the client application phone book list screen, FIG. 6 illustrates a mobile communication device running the client application conference setup screen, and FIG. 7 illustrates a mobile communication device running the client application in a conference call.

In order to make the invention more readily understandable, the discussion that follows will refer to the accompanying tables, wherein Table 1 lists an exemplary code set for messages sent from client to server when scheduling an ad-hoc conference, and Table 2 lists an exemplary code set for messages sent from server to client when scheduling an ad-hoc conference.

DETAILED DESCRIPTION

In the following, the present invention will be discussed by describing non-limiting embodiments, and by referring to the accompanying drawings. However, people skilled in the art will realize other applications and modifications within the scope of the invention as defined in the enclosed independent claims.

The non-limiting embodiments of the present invention introduce a novel system and novel methods for scheduling conference calls and managing conference equipment from a mobile communication device, such as mobile phones and PDA's. This is utilised by communicating with a server, e.g. a Conference Management server, and instructing the server to perform certain actions, such as to set up conference calls between conference endpoints, manage and monitor conference endpoints and network devices, from a client application on a mobile communication device. Having a management server to manage and monitor calls also allows calls between protocols if network gateways are available for use. In addition, an administrator can monitor the status of calls, and the server can store call logs, statistics, etc. for each mobile communication device respectively.

FIG. 1 is a block diagram showing a typical configuration of a system according to a non-limiting embodiment of the present invention.

The system comprises at least a mobile communication device 1 and a server 2. The mobile communication device 1 can be a mobile phone, a portable radio communication terminal such as a PDA (Personal Digital Assistant) or the like. The mobile communication device 1 has a client application installed, wherein said client application is able to connect to and communicate with a server 2 via a wireless communication network 5.

The mobile communication device 1 comprises a processing device, a memory for storing processing instructions, including the client application mentioned above, and other data. The mobile communication device 1 further comprises a wireless communication adapter for enabling wireless communication with the network 5. The client application is a computer program which comprises instructions which, when executed by the processing device in the mobile communication device, causes the mobile communication device to perform a method in accordance with the invention, as described by example in the following detailed description, in particular with reference to FIG. 2. The practical implementation of such instructions involves routine abilities of the skilled person, based on the present specification. Such instructions may be tangibly embodied in the memory of the mobile communication device, or alternatively, they may be tangibly embodied in another memory, such as semiconductor memory, or on a separate storage device such as an optical or magnetic medium (e.g., computer readable storage mediums). Likewise, the instructions may be tangibly embodied on a propagating signal (e.g. a signal propagated during uploading, downloading, messaging or other kinds of transfer between elements of a computer network such as the Internet or through a wireless communication network).

The server 2 provides a service interface with the mobile communication device, and is further operably connected to several (four illustrated by example) video conferencing end-points 3 on a second communication network 6.

The server 2 can be a management system controlling a range of telecommunication units and other equipment, as described above, or it could also be a single telecommunication unit, such as a video conferencing end-point or the like.

The server 2 comprises a processing device and a memory for storing processing instructions and other data. The server 2 further comprises a wireless communication adapter for enabling wireless communication with the network 5. The server 2 runs a computer program (stored in a computer readable storage medium) that comprises instructions which, when executed by the processing device in the server 2, causes the server 2 to perform a method in accordance with the examples in the following detailed description, in particular with reference to FIG. 3. The practical implementing of such instructions involves routine abilities of the skilled person, based on the present specification. Such instructions may be tangibly embodied in the memory of the server, or alternatively, they may be tangibly embodied in another memory, such as semiconductor memory, or on a separate storage device such as an optical or magnetic medium (e.g., computer readable storage mediums). Likewise, the instructions may be tangibly embodied on a propagating signal (e.g. a signal propagated during uploading, downloading, messaging or other kinds of transfer between elements of a computer network such as the Internet or through a wireless communication network).

The client application on the mobile communication device 1 reflects the functionality supported by the server 2. The communication protocol between the client and the server can be any standard communication protocol such as http, Bluetooth, IP, SIP etc.

Communication network 5 may further employ a plurality of access technologies including, but not limited to, 2nd (2G), 2.5 (2.5G), 3rd (3G) generation radio access for cellular systems, WLAN, Wireless Router (WR) mesh, and the like. Access technologies such as 2G, 2.5G, 3G, and future access networks may enable wide area coverage for mobile communication devices, such as mobile communication device 1, with various degrees of mobility. For example, communication network 5 may enable a radio connection through a radio network access such as Global System for Mobile communication (GSM), General Packet Radio Services (GPRS), Enhanced Data GSM Environment (EDGE), Code Division Multiple Access (CDMA), and the like. In essence, communication network 5 may include virtually any wireless communication mechanism by which information may travel between mobile communication device 1 and server 2.

The second network 6 may be the Internet, a wired or a wireless telecommunication network, a local area network (LAN), a wireless wide area network (WWAN), a wireless local area network (WLAN), or a circuit-switched telephone network (e.g. Integrated Services Digital Network, ISDN). Mobile Operator Gateways may provide a routing server utilized by the mobile operator to connect the mobile operator's private network to the public Internet, thereby enabling the mobile communication device 1 to access nodes, servers and/or resources on the Internet.

In a non-limiting exemplary embodiment of the invention, the server 2 in FIG. 1 is a server running a VCMP (Video Conferencing Management Program). As mentioned above, video conferencing systems are often provided with a management system, or more specifically a VCMP. VCMP's are used for scheduling the use of network resources, video conferencing systems, etc. The VCMP must be connected to a database containing updated information regarding all accessible resources like MCU's, gateways, routers, video conferencing end-points etc.

Further, a VCMP, for example, provides system and resource overview, allowing the user to create, edit, and delete reservations, reserve resources for dial-in participants and specify bandwidth and network settings. The VCMP may also support automatic call routing and automatic selection of point-to-point connection, including one or more MCU's. Further, the VCMP may control any video conferencing endpoint 3 connected to the VCMP. The VCMP normally operates with an intuitive web interface requiring no additional installation on the user terminal other than a conventional web browser.

As mentioned above the server 2 is typically connected to one or more databases. As shown in FIG. 1, in one embodiment of present invention the server 2 is connected to a user database 4 containing records of video Conferencing endpoints connected to the VCMP running on the server 2 and information related to said end-points, such as the Entry_ID, Entry name (name displayed in phonebook service, e.g. name of the end-point user or name describing endpoint location), end-point IP-address, alias, ISDN-number, GSM-number, geographical location, organization affiliation, etc. The server 2 uses at least parts of said database records to generate a phone book service for its connected end-point and their users. The phone book service is also typically used when scheduling video conference calls through a web based user interface connected to the server 2 or when making a call from an endpoint.

According to one exemplary embodiment of the invention, the client application on the mobile communication device 1 can search for systems to use or people to contact from the resources (phone book) controlled by the server 2. E.g. setting up a multi point conference from the mobile communication device is performed by accessing the phone book service provided by the server 2, choosing participants and/or systems to attend the conference, generating and sending conference setup data to the server, and let the server 2 decide how the conference is being set up. The mobile communication device may be called up like the other participants, or the mobile communication device may be left out of the conference entirely.

According to another exemplary embodiment of the present invention, the client application could connect to a single video conferencing endpoint (or another network device such as a gateway, gatekeeper, MCU, etc.) through the VCMP running on the server 2, or connect directly to the equipment, and control the settings on or operations supported by the telecom system, making the mobile communication device act as a remote control.

According to another embodiment of the present invention, the server 2 is configured to store the identity of the mobile communication devices 1 running the client application. The identity of the mobile communication device 1 is typically the phone number of the device 1, but can also be another number uniquely identifying said device. The identity of the mobile communication devices is stored in a database interoperable connected to the server 2. By creating a database record connected to one specific mobile communication device 1 on the server 2 database, personal setting and operations can be stored for later access. The information stored with the device identity can e.g. be last numbers dialed, preferred equipment list, phonebooks, stored personalized data, pre-configured conference settings, etc. The pre-configured conference settings include identifiers for the participants (and/or endpoints) of the pre-configured conference, and addresses for the various endpoints. Also, preconfigured conference settings may include preferred resources to reserve and use for the pre-configured conference.

For example, consider a user, Bob, having frequent ad-hoc video conferences with his team members in Washington and New York from a meeting room video conferencing system in Baltimore. Since the meeting room video conferencing system is a public system, it is typically used by several other users in between the team meetings. Since Bobs previous calls most likely are deleted from the "last calls" list or if he is using different end-point, he must redial the conference attendees. Further, if the endpoint he is calling from is not supporting multi-point calls, he must dial through a MCU or schedule the conference in a VCMP using a computer. Using his always present mobile phone 1 bob starts his client software and connects to the server 2. The client software sends its unique identifier to the server 2. The server 2 compares the identifier to its database records, and retrieves the matched record if a mach is found. Now, the user may choose between different personal operations. Since Bob frequently has video conferences with Washington and New York, he has created a listing called "Design meeting" in a "speed dial" menu. The "Design meeting" is an example of a pre-configured conference. The conference setup data for such operations has been created beforehand and stored in the database, either via the client application or via a web interface. So, when Bob selects the "Design meeting" listing from the speed dial menu and presses "connect call", the client sends a "request conference" message to the server, the message at least includes the an alphanumerical code identifying the stored setup data at the server. Based on the stored setup data, the server decides how the conference is being set up, e.g. if a MCU is needed, if ISDN or 3G gateways is needed, etc.

In addition, instead of selecting "Design meeting," Bob may select one the last numbers he dialed from a menu that allows Bob to select from the last video conference calls he made. Such a "last call" list may be displayed by a graphical user interface.

If a match of the ID of the mobile communication device is not found in a database of server 2, server 2 defines the mobile communication device as an unknown user. The server 2 may treat the unknown user in many ways. The server 2 may allow the unknown user to access the system, or the server 2 may return a "not handled by server" message to the mobile communication device and terminate the communication with the mobile communication device. The server 2 may request a password to allow the unknown (or known) user to be granted access. If the unknown mobile communication device 1 is granted access, the server may store the identity of the new mobile communication device 1 in the database, and start storing information (e.g. call history) and allow the mobile communication device to create personal settings and operations. Further, the server may be configured to request the client application for an access password even if the mobile communication device is identified by the server.

When utilizing the client server configuration according to non-limiting embodiments of the present invention, all calls will be managed by the company hosting the server 2. Private calls can be made using the normal mobile communication device communication protocol like GSM or within an option in the client program. Hence, it becomes easy to distinguish between work related and private calls and the respective billing will automatically be sent to the right address.

The client application according to non-limiting embodiments of the present invention may be used with already existing video conferencing managing programs by installing a proxy application on the server. The proxy application is able to receive and parse instructions from the client application and act and respond accordingly.

The VCMP will typically have access to most telecommunication units and network resources within a corporation and an up to date phone book. The VCMP can choose to make all these resources available to a mobile communication device client or only a subset of said recourses, depending on the organizations policy and access rights for the uniquely identified user. The client application according to non-limiting embodiments of the present invention may either be implemented locally on the mobile communication device 1 (Java application), or externally on a WAP server or on a Video Portal (3G application). A Video Portal is a network device providing access to live or on-demand content from 3G-enabled devices.

When a client connects to the server 2, it may be done by using HTTP either locally on the mobile phone (i.e. case of the Java application), or externally by server side scripting (i.e. PHP scripts in WAP and 3G). An HTTP POST request is formed by the client. The POST request contains a connection code that serves as the interface towards the server (see exemplary connection codes and syntax in table 1). The POST request may include an identifier of the mobile communication device, an identifier of the user of the mobile communication device, and/or a control message that requests identified information from the server. Each connection code is interpreted by the server and a response is sent accordingly. The response contains a status code and a body element with the requested data (see exemplary connection codes and syntax in table 2). The client parses the body element in the HTTP response, and creates a user friendly graphical user interface based on the elements. For example, if the requested information is a phone book, the phone is provided to mobile device from the server. The requested information may also be a list of pre-configured conferences, or a list of last calls made.

When a client is ready to start a conference, it sends an HTTP request with a connection code equivalent to "setup conference" to the server and identifiers that indicate the participants of the videoconference. The identifiers that indicate the participants of the video conference may include one or more identifiers selected from a phone book, a identifier of a pre-configured conference, or an identifier of a previous video conference call from the list of last calls. The server extracts the necessary information from the request (i.e. ids of participants, phone number of client, etc.) and contacts the MCU, which in turn initializes the conference. As mentioned above, the MCU sets up a video or audio call to each participant.

Tables 1 and 2 shows a set of connection codes for setting up a conference call by retrieving attendee information from the servers updated phone book service. This is just an example set, and should not be considered limiting for the present invention.

The following example describes, in detail, one way to set up a multipoint conference from a mobile communication device according to a non-limiting exemplary embodiment of the present invention.

FIG. 2 is a flow diagram showing an exemplary client and server communication session from the client side.

The illustrated process is a method in a mobile communication device for managing conference equipment.

As can be seen in step 201 in the flow diagram in FIG. 2, the user starts by launching the application on his/her mobile phone. The graphical user interface (GUI) of the client may look something like the GUI shown in FIG. 4. When the client application has launched, the user may be presented with a menu or the like with several options. As shown in FIG. 4, according to one non limiting exemplary embodiment, the startup screen has tree menu listings; connect, setup and exit. The start up screen may of course have other menu listings.

In step 202, a connection with the video conferencing management server is established via the wireless network.

In the illustrated example, the connection establishing is initiated by the user choosing the "connect" listing in the startup menu, which results in that the client sends a "request connection" message 01 to the server 2 via network 5. If the connection for some reason fails, the communication is terminated and the client will display a "connection failed" message to the user. If the message reached the server 2, the server 2 returns a 101 message to the client to verify that the connection is ok (203; 302).

Consistent with an aspect of the invention, the step of establishing a connection comprises sending a control message to the server, the message including an identification number that uniquely identifies the mobile communication device.

The connection establishing may further comprise the steps of extracting the identification number from the control message and comparing the identification number with an entry in a user database in the server, and if the identification number does not exist, storing the identification number in a new record in the database, storing personalized conference data relating to said identification number in respective database record, and submitting the personalized data to the mobile communication device on demand.

Consistent with an aspect of the invention, the personalized data comprises a list of previously established conference calls. Consistent with another aspect, the personalized data comprises a list of preconfigured conferences, e.g. favourites or speed-dials. Consistent with still another aspect of the invention, the personalized data comprises a customized list of video conferencing endpoints connected to the server.

When connection is established, control messages may be sent to the server via the wireless network.

For security and personalized access, a login may be required. Therefore, the client asks the user to type in his/her password and press "ok". The client then sends a message containing the phone number for the mobile communication device 1 running the client together with the password (303). E.g. the message may look something like; |02|phone_number|passwd|. The server returns 102 to verify that the login succeeded, or 002 if login is refused. If login fails 3 times (LF>3) the connection is terminated.

The method further comprises steps of requesting information from the server, and receiving the information from the server.

Consistent with an aspect of the invention, this information comprises the stored personalized data mentioned above.

Consistent with another aspect of the invention, the information comprises one or more listings of video conferencing endpoints that are connected to the server.

This is further explained by example in the following:

When the user is logged in, he/she may have access to a variety of options, wherein one or more of the options may include personalized settings or operations, e.g. last calls, speed dial listings, personal or preferred endpoints, etc. At least one of the options is "set up a conference". The user presses (204) the "set up a conference" button to indicate that he or she wants to set up a conference. The client 1 then sends a request message to the server 2 including at least a command telling the server 2 that a client wishes to receive a list of available phone books and the phone number of the mobile communication device 1 running the client (305); e.g. |05|phone_number|. Upon reception of such a request message, the server returns an acknowledgment together with a list of available phonebooks (step 205; 306); e.g. |105|num_phone_lists|phone_list_name1|phone_list1_id|phone_list_name2|phone_list2_id| ... |. This list of phonebooks is cached in a memory in the mobile communication device 1 for quick access, and will not be requested again unless the client application is restarted. Phone_list1 mentioned above may e.g. be a company's U.S office endpoints, phone_list2 may e.g be a company's UK office endpoints, etc.

In step 206 the user selects one of the phone books from the list, as shown in FIG. 4. The client then sends a message to the Server 2, the message includes a command telling the server that the message is a request for a phonebook, an identifier identifying the requested phonebook and the number of the mobile communication device running the client (307); e.g. |03|phone_list_id|phone_number|. The server returns a message with an acknowledgment and the content of the selected phonebook (308); e.g. |103|num_entries|name_1|id_1|name_2|id_2| ... |. The phone book is stored (step 207) in a memory in the mobile communication device 1 and will not be requested again until the application is restarted. If the user selects the same phone book at a later stage, the client loads the phone book from its memory.

When the user has received the desired phonebook, he/she selects the participant he/she wishes to include in the conference call from the phonebook (step 208). When the user has selected a participant the client enters the Conference setup screen (FIG. 5). Again the user is presented with several options. The user can add more participants or proceed to connect the call (step 209). If the user wishes to add more participants the client loads the stored phonebook list from memory and steps 207-209 are repeated. If the selected phonebook in step 206 exist in memory, there is no need to acquire it from the server 2. In order to reduce the number of steps, a checkbox system may be introduced in each phonebook, so that multiple participants can be chosen before proceeding.

The method of FIG. 2 further comprises the step of instructing the server to execute predefined actions. Consistent with an aspect of the invention, the predefined actions may comprise scheduling or establishing video conference calls. Consistent with another aspect, the predefined actions comprise managing endpoints or network devices, e.g. MCUs, gatekeepers and gateways, directly. The predefined actions may alternatively comprise monitoring or diagnosing one or more endpoints, network devices and conferences, or any combination of such elements.

Consistent with an aspect of the invention, the step of instructing the server comprises allowing a user to select one or more video conferencing endpoints from said one or more listings, and creating a control message identifying the selected one or more video conferencing endpoints.

The above and other aspects of the invention are further explained by example in the following:

When all the participants have been selected, the user can press "Set up Conference" (step 210) to create a conference call between the selected participants, or press "Set up Conference and call me up" (step 211) to create a conference call between the selected participants and the mobile communication device 1. Selecting one of the two options above triggers the client to send a message to the server 2, wherein the message at least includes a command telling the server 2 that the message is a request for a call setup, a parameter indicating if the mobile communication device is to be included in the call or not, the number of the mobile communication device if to be included, the number of other participants, and the identification numbers of the other participants (309); e.g. |04|numPhoneNumbers|numID|tlp1|type1tlp2|type2| ... |id1|id2|id3| ... |. Type1, type2, etc. indicates if the respective phone should be called up on 3G or audio only. 3 indicates 3G, 1 indicates audio. If the user wants to be dialed up on 3G with two participants (id1 and id2), the message could be: 04|1|2|phone_number|3|id1|id2|. If the user doesn't want to be called up the message is; 04|0|2|id1|id2. After the message has been sent the application shuts down. The server 2 fetches the necessary information related to the identified participants (id1, id2) from its database, e.g. IP-number and/or ISDN number, and sets up the conference (310-311). The mobile communication device 1 that was used to select participants for the conference will be called up like the rest of the participants if "setup conference and call me up" was selected (FIG. 5).

According to another non-limiting exemplary embodiment of the present invention, the user uses stored personalized information to set up a conference call. When the client sends a "request connection" message 01 to the server 2 via network 5, said request message will include an identification number, typically the phone number of the mobile communication device. As, described above, the server matches this identification number to a device database. If a match is found, the server 2 may store certain information related to the identified device 1. This is hereafter illustrated with a "last conferences" example, where the server 2 is configured to store the last 10 conferences made from a client application on a mobile phone. The last conference set up by a client residing on a mobile communication device 1, with identification number A123, was a conference between participants with id numbers; id2, id54 and id612. The id numbers are numbers in the servers 1 phone book database, uniquely identifying each endpoint in the database (se Entry_id above). When the conference call was requested by the client, the server stored the conference setup data in a "last calls"-list and gave it an identification code. The stored data may look something like; |LC01|LC_Entry_name_01|id2,id54,id612|0|. LC01 is the identification code of the conference call, LC_Entry_name is the name to be displayed in the client application, id is the unique id number of the participants, and the last digit shows if the mobile communication device was included in the conference call or not. The entry name can be manually entered by the user, or as a default the server may compiles a name comprises the Entry_names, or parts thereof, of the participants.

When the user is logged in (se step 201-203 above), the client application presents the user with several options, and at least a "last calls" option. If the user chooses the "last calls" option, the client sends a message to the server 2 including at least a command telling the server 2 that a client wishes to receive a list of the 10 last calls registered for said client, and the phone number of the mobile communication device 1 running the client; e.g. |06|phone number|. Upon reception of such a request message, the server returns an acknowledgment together with a list of available conference calls from the "last calls"-list related to said device; e.g. |106|num_conferences|LC_Entry_name01|LC01| LC_Entry_name02|LC02| ... |. The server only needs to send the names of the available calls, and their respective identification codes. The client parses the information from the server and creates a "last calls" screen to the user, listing all the available last calls stored in the server database. If the user selects one of the listed calls, e.g. LC_Entry_name__02, the client sends a message to the server 2, wherein the message at least includes a command telling the server 2 that the message is a request for a call setup from the "last calls" database record and the id number of the selected conference call; |07|LC02|. The client does not need to send more information, because all the information needed to establish the call may be collected from the server's 2 device database and further information from the server's 2 user database (phone book service), after parsing the message.

FIG. 3 is a flow diagram showing an exemplary client and server communication session from the server side.

The process illustrated in FIG. 3 is a method in a video conferencing management server for managing conference equipment from a mobile communication device.

The method comprises the initial step of establishing a connection with the mobile communication device via the wireless network. According with an aspect of the invention, the establishing is initiated by receiving 301 a connection request from the client, e.g. as explained above with reference to FIG. 2.

According to an aspect of the invention, the connection establishing step comprises receiving a control message which includes an identification number uniquely identifying the mobile communication device.

The establishing step may further comprise extracting the identification number from the control message and comparing the identification number with an entry in a user database in the server, and if the identification number does not exist, storing the identification number in a new record in the database, storing personalized conference data relating to the identification number in respective database record, and submitting the stored personalized data to the mobile communication device on demand.

Consistent with an aspect of the invention, the personalized data comprises a list of previously established conference calls. Consistent with another aspect, the personalized data comprises a list of preconfigured conferences, e.g. favourites or speed-dials. Consistent with still another aspect of the invention, the personalized data comprises a customized list of video conferencing endpoints connected to the server.

When connection is established, control messages may be received from the mobile communication device (the client) via the wireless network.

A login procedure corresponding to the above description of the client method shown in FIG. 2 may be performed, initiated by a request received 303 from the client.

If login is successful, a confirmation is sent 304.

The method further comprises receiving a request for information from the mobile communication device via the wireless network, and submitting this information to the mobile communication device.

Consistent with an aspect of the invention, this information comprises the stored personalized data mentioned above.

Consistent with another aspect of the invention, the information comprises one or more listings of video conferencing endpoints that are connected to the server.

The method shown in FIG. 3 further comprises the step of executing predefined actions, instructed by the mobile communication device. Such predefined actions are specified above with reference to FIG. 2.

Certain elements illustrated in FIG. 3 have already been referred to above in connection with the explanation of FIG. 2.

The above described non-limiting embodiments of the present invention provide a novel method and system for establishing conference calls. A client on a mobile communication device communicating with a conference management server provides the user with an extremely mobile and user friendly solution to ad-hoc multisite video conference scheduling, even between different protocols. Further, the possibility to store and have access to personalized conference information, makes it possible to use any endpoint as if it was your own personal endpoint, with call history, favorites, etc. and even preferred settings and actions. Since the communication between the client and the server is on a wireless network, e.g. cellular network, the user is independent of computers and internet connections.

The invention claimed is:

1. A system for managing conference equipment, said system comprising:
    a mobile communication device configured to communicate over a wireless network;
    a video conferencing management server configured to schedule video conference calls between two or more video conferencing endpoints connected to a communication network, wherein
    said mobile communication device is configured to
        establish a connection with said video conferencing management server via said wireless network,
        receive information from said video conferencing management server, said information including one or more lists of entries from one or more phone books or personal video conference preferences of a user of the mobile communication device provided by said video conferencing management server,
        generate a user interface allowing the user to select one or more entries from said one or more phone books or personal video conference preferences, and
        create a control message, based on one or more entries selected from said one or more lists or the personal video conference preferences, to instruct said video conferencing management server to initiate or schedule a videoconference.

2. The system according to claim 1,
    wherein the video conferencing management server is configured to manage endpoints or network devices directly.

3. The system according to claim 1,
    wherein the video conferencing management server is configured to monitor and diagnose at least one of endpoints and network devices.

4. The system according to claim 1,
    wherein said information comprises one or more listings of video conferencing endpoints connected to said video conferencing management server.

5. The system according to claim 1, wherein
    said mobile communication device is uniquely identified by an identification number, and that the mobile communication device is further configured to send said identification number to said video management conferencing server when establishing said connection.

6. The system according to claim 5, wherein
    said video conferencing management server is configured to
    receive a connection request control message from said mobile communication device,
    extract said identification number from said connection request control message, and
    compare said identification number with entries in a user database,
    wherein if said identification number does not exist, the video conferencing management server is configured to store said identification number in a new record in said user database, store the personal video conference preferences of the user of the mobile communication device relating to said identification number in the new record, and submit said stored personal video conference preferences to said mobile communication device.

7. The system according to claim 1, wherein said personal video conference preferences comprises a list of previously established conference calls.

8. The system according to claim 1, wherein said personal video conference preferences includes a list of preconfigured conferences.

9. The system according to claim 1, wherein said personal video conference preferences comprises a customized list of video conferencing endpoints connected to said video conferencing management server.

10. The system according to claim 1, wherein said mobile communication device is further configured to
allow a user to select from said personal video conference preferences, and
create the control message identifying a video conference participant selected from said personal video conference preferences.

11. A method in a mobile communication device for communication over a wireless network for managing conference equipment, comprising:
establishing a connection with a video conferencing management server via said wireless network;
receiving information from said video conferencing management server, said information including one or more lists of entries from one or more phone books or personal video conference preferences of a user of the mobile device;
generating a user interface to allow the user to select one or more of said entries from said one or more phone books or personal video conference preferences; and
creating a control message, based on at least a selected one or more of said entries from said one or more phone books or personal video conference preferences, that instructs said video conferencing management server to initiate or schedule a videoconference.

12. The method according to claim 11, further comprising: managing endpoints or network devices directly.

13. The method according to claim 11, further comprising: monitoring or diagnosing at least one of endpoints and network devices.

14. The method according to claim 11, wherein said personal video conference preferences comprises one or more listings of video conferencing endpoints that are connected to said video conferencing management server.

15. The method according to claim 11, wherein the one or more lists includes a list of one or more video conferencing endpoints, and the method further comprises:
allowing the user to select one or more video conferencing endpoints from said one or more lists; and
creating the control message identifying a selected one or more video conferencing endpoints.

16. The method according to claim 11, wherein the establishing further comprises:
sending a packet that includes an identification number uniquely identifying said mobile communication device.

17. The method according to claim 16, wherein the establishing further comprises:
extracting said identification number from said packet;
comparing said identification number with an entry in a user database in said video conferencing management server, and
if said identification number does not exist,
storing said identification number in a new record in said database,
storing the personal video conference preferences of the user of the mobile device relating to said identification number in a respective database record, and
submitting said personal video conference preferences to said mobile communication device.

18. The method according to claim 11, wherein said personal video conference preferences includes a list of previously established conference calls.

19. The method according to claim 11, wherein said personal video conference preferences includes a list of preconfigured conferences.

20. The method according to claim 11, wherein said personal video conference preferences includes a customized list of video conferencing endpoints connected to said video conferencing management server.

21. The method according to claim 11, further comprising:
allowing a user to select from said stored personalized conference data; and
creating the control message identifying a video conference participant selected from said stored personal conference data.

22. A method in a video conferencing management server for managing conference equipment from a mobile communication device, comprising:
connecting with said mobile communication device via a network;
transmitting information to said mobile communication device, said information including one or more lists of entries from one or more phone books or personal video conference preferences of a user of the mobile communication device stored at said video conferencing management server;
receiving a control message from said mobile communication device, wherein said control message identifies a device corresponding to a selected one or more entries included in the one or more phone books or personal video conference preferences; and
initiating or scheduling a video conference between the mobile communication device and the device corresponding to the selected one or more entries included in the one or more phone books or personal video conference preferences.

23. The method of claim 22, further comprising:
directly managing endpoints or network devices.

24. The method of claim 22, further comprising:
monitoring and diagnosing at least one of endpoints and network devices.

25. The method of claim 22, wherein said information includes one or more listings of video conferencing endpoints connected to said video conferencing management server.

26. The method of claim 22, wherein said connecting further comprises:
receiving an identification number from the mobile communication device that uniquely identifies the mobile communication device.

27. The method of claim 26, further comprising:
receiving a connection request control message from said mobile communication device, which includes the identification number;
extracting said identification number from said connection request control message; and
comparing said identification number with entries in a database, wherein if said identification number does not exist, the method includes creating a new record in said database, and storing the personal video conference preferences relating to said identification number in the new record.

28. The method of claim 22, wherein said personal video conference preferences comprises a list of previously established conference calls.

29. The method of claim 22, wherein the personal video conference preferences includes a list of preconfigured conferences.

30. The method of claim 22, wherein said personal video conference preferences includes a customized list of video conferencing endpoints connected to said video conferencing management server.

31. A non-transitory computer readable storage medium encoded with instructions, which when executed by mobile communication device cause the mobile communication device to implement a method for communication over a wireless network for managing conference equipment, comprising:
　　establishing a connection with a video conferencing management server via said wireless network;
　　receiving information from said video conferencing management server, said information including one or more lists of entries from one or more phone books or personal video conference preferences of a user of the mobile device;
　　generating a user interface to allow the user to select one or more of said entries from said one or more phone books or personal video conference preferences; and
　　creating a control message, based on at least a selected one or more of said entries from said one or more phone books or personal video conference preferences, that instructs said video conferencing management server to initiate or schedule a videoconference.

32. A non-transitory computer readable storage medium encoded with instructions, which when executed by a video conferencing management server causes the video conferencing management server to implement a method for managing conference equipment from a mobile communication device, comprising:
　　connecting with said mobile communication device via a network;
　　transmitting information to said mobile communication device, said information including one or more lists of entries from one or more phone books or personal video conference preferences of a user of the mobile communication device stored at said video conferencing management server;
　　receiving a control message from said mobile communication device, wherein said control message identifies a device corresponding to a selected one or more entries included in the one or more phone books or personal video conference preferences; and
　　initiating or scheduling a video conference between the mobile communication device and the device corresponding to the selected one or more entries included in the one or more phone books or personal video conference preferences.

* * * * *